United States Patent
Malitz

(10) Patent No.: US 10,346,952 B2
(45) Date of Patent: *Jul. 9, 2019

(54) AUTOMATED SEAMLINE CONSTRUCTION FOR HIGH-QUALITY HIGH-RESOLUTION ORTHOMOSAICS

(71) Applicant: DigitalGlobe, Inc., Longmont, CO (US)

(72) Inventor: Seth Malitz, Aurora, CO (US)

(73) Assignee: DigitalGlobe, Inc., Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/860,281

(22) Filed: Jan. 2, 2018

(65) Prior Publication Data

US 2019/0005618 A1   Jan. 3, 2019

Related U.S. Application Data

(63) Continuation of application No. 14/789,877, filed on Jul. 1, 2015, now Pat. No. 9,858,645.

(60) Provisional application No. 62/019,876, filed on Jul. 1, 2014.

(51) Int. Cl.
*G06T 3/40* (2006.01)
*G06F 16/56* (2019.01)
*G06F 16/532* (2019.01)
*G06F 16/583* (2019.01)

(52) U.S. Cl.
CPC .......... *G06T 3/4038* (2013.01); *G06F 16/532* (2019.01); *G06F 16/56* (2019.01); *G06F 16/5838* (2019.01)

(58) Field of Classification Search
CPC ......... H01L 2924/0002; H01L 2924/00; H01L 23/3672; H01L 23/3675; H01L 23/373; H01L 23/3737; H01L 23/38; H01L 23/427; H01L 23/4275; G06F 17/3025; G06F 17/30256; G06F 17/30271; G06F 17/30277
See application file for complete search history.

(56) References Cited

U.S. PATENT DOCUMENTS

2002/0163582 A1* 11/2002 Gruber ................... G01C 11/02
348/218.1
2009/0232349 A1*  9/2009 Moses ................... G06F 9/5072
382/100

* cited by examiner

*Primary Examiner* — Manuchehr Rahmjoo
(74) *Attorney, Agent, or Firm* — Brian R. Galvin; Brian S. Boon; Galvin Patent Law, LLC

(57) ABSTRACT

A system for semi-automated feature extraction comprising an image analysis server that receives and initializes a plurality of raster images, a feature extraction server that identifies and extracts image features, a mosaic server that assembles mosaics from multiple images, and a rendering engine that provides visual representations of images for review by a human user, and a method for generating a cost raster utilizing the system of the invention.

1 Claim, 6 Drawing Sheets

AUTOMATED SEAMLINE CONSTRUCTION FOR HIGH-QUALITY HIGH-RESOLUTION ORTHOMOSAICS

CROSS-REFERENCE TO RELATED APPLICATIONS

This application is a continuation of U.S. patent application Ser. No. 14/789,877 titled "AUTOMATED SEAMLINE CONSTRUCTION FOR HIGH-QUALITY HIGH-RESOLUTION ORTHOMOSAICS", filed on Jul. 1, 2015, which claims the benefit of, and priority to, U.S. provisional patent application Ser. No. 62/019,876, titled "METHODS FOR CREATING A COST RASTER FOR AUTOMATED AND SEMI-AUTOMATED FEATURE EXTRACTION" and filed on Jul. 1, 2014, the entire specifications of each of which are incorporated herein by reference.

BACKGROUND OF THE INVENTION

Field of the Art

This disclosure relates to the field of image processing, and is particularly concerned with the automatic construction of high-quality high-resolution orthomosaics from satellite or aerial imagery.

Discussion of the State of the Art

To build an orthomosaic from satellite or aerial imagery, participating images are first orthorectified, co-registered, and tonally balanced, and then a seamline vector is constructed for every pair (in essence) of images A and B that overlap. Once all these seamlines are computed, images are clipped by their seamlines to form mosaic regions that fit together like puzzle pieces. In high-quality orthomosaics, the seamlines are as inconspicuous as possible so that the mosaic actually appears seamless (seamlines are inconspicuous when local mosaic content shows natural transition going from one side of the seamline to the other.) In the past, to get this level of quality required manual construction of the seamlines—a tedious and labor-intensive process. Automated systems for constructing orthomosaics must generate seamlines automatically and, if required, necessitate only minimal human touch-up. An existing approach for doing this is to auto-generate a "cost" raster per seamline, and automatically extract the seamline as a least cost path between two points using, say, Dijkstra's algorithm. What has been missing is a recipe for creating a cost raster that leads to an inconspicuous seamline (inconspicuous over a diverse range of image content) and especially in the most complex areas where there is human development. Prior art cost rasters for seamline construction were based primarily on tonal similarity between corresponding pixels in the involved images—this is insufficient in many cases to yield an inconspicuous seamline.

What is needed is a way of constructing a cost raster that will lead to an inconspicuous seamline, over a diverse range of image content, especially in the most complex areas where there is human development. This is especially needed for high-quality, high-resolution, RGB orthomosaics that may be formed from any part of the globe.

SUMMARY OF THE INVENTION

Accordingly, the inventor has conceived and reduced to practice, in a preferred embodiment of the invention, a system and method for automated construction of inconspicuous seamlines in an orthomosaic, the seamlines realized as least cost paths extracted from respective cost rasters. The main novel aspect of the invention is the design of the cost raster itself, which yields inconspicuous seamlines over a diverse range of image content, especially in the most complex areas where there is human development.

According to a preferred embodiment of the invention, a system for automated construction of inconspicuous seamlines in an orthomosaic comprising a vector server stored and operating on a network-connected computing device, a raster server stored and operating on a network-connected computing device, a mosaic construction engine stored and operating on a network-connected computing device, a feature extraction engine stored and operating on a network-connected computing device, a seamline construction engine stored and operating on a network-connected computing device, and a rendering engine stored and operating on a network-connected computing device, is disclosed. According to the embodiment, a raster server may retrieve orthorectified raster images from a raster storage, for example, such as satellite images or similar raster image data that depict an actual physical environment. Retrieved rasters may be provided to a mosaic construction engine, which first co-registers and tonally balances the raster images, then sends requests to the seamline construction engine to build the seamlines. Each seamline request involves a pair of overlapping images A and B. The seamline construction engine calls the feature extraction engine to identify those pixels in image A and image B (within the overlap region) associated with certain classes of features, particularly linear features. The seamline construction engine builds a cost raster from the results of the feature extraction engine, and extracts the seamline as a least cost path from the cost raster. The seamline construction engine sends requested seamline vectors back to the mosaic construction engine, which then clips the original raster images against the seamlines to form the orthomosaic.

The orthomosaic may then be provided to a rendering engine, as may be presentable on a viewer such as a display screen, for example for review by a human user. Additionally, a user may manipulate the visualization using a variety of input devices such as, for example, a computer mouse or keyboard to zoom in or zoom out. As needed, the seamline vectors of the mosaic may be sent to the vector server and persisted in the vector storage for future reference. The vector storage might be a database or other data storage means (such as, for example, integral or removable hardware-based storage such as a hard disk drive, or software-based storage schema common in the art.)

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
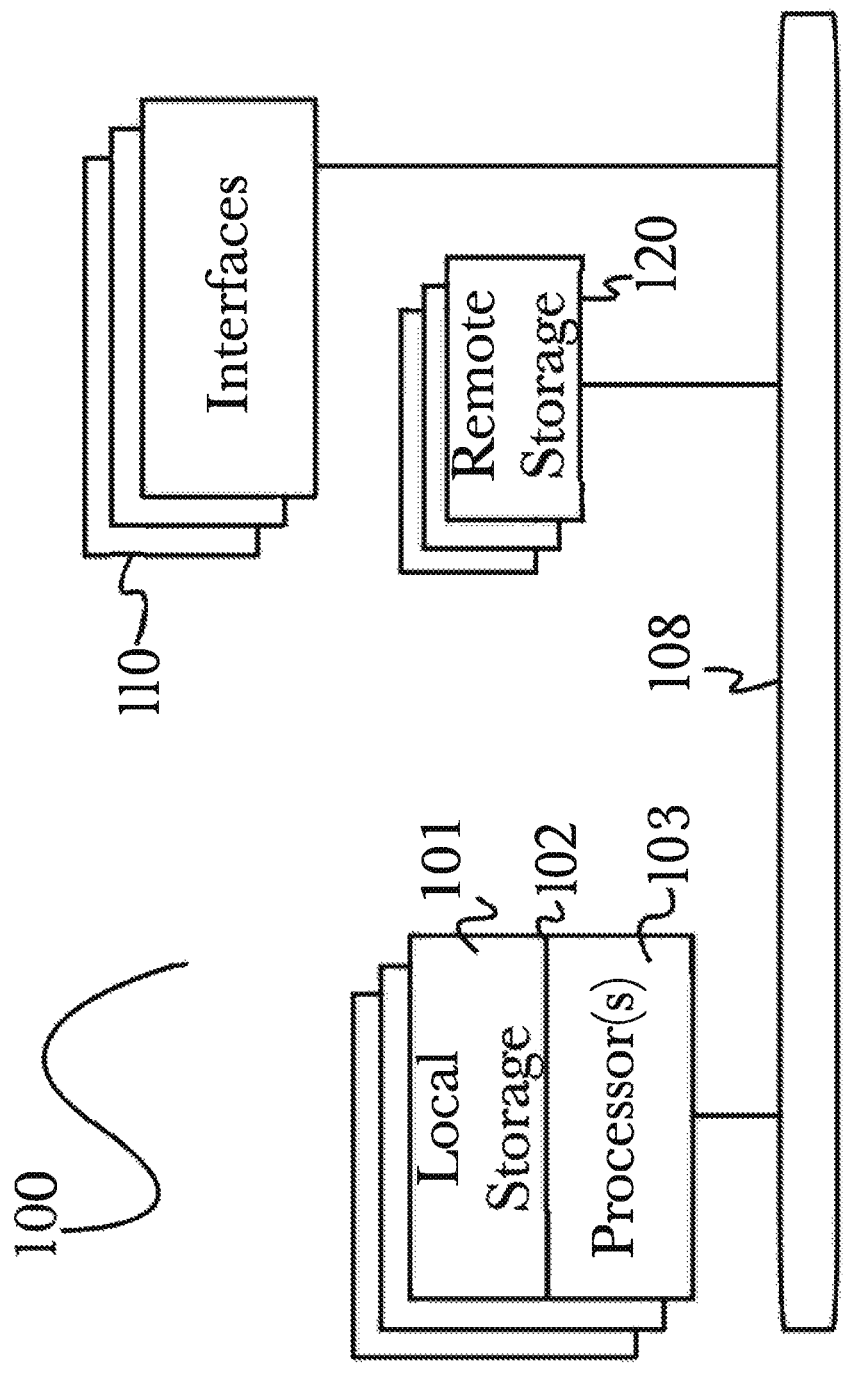
FIG. 1 is a block diagram illustrating an exemplary hardware architecture of a computing device used in an embodiment of the invention.

The inventor has conceived and reduced to practice, in a preferred embodiment of the invention, a system and method for automated construction of inconspicuous seamlines in an orthomosaic, the seamlines realized as least cost paths extracted from respective cost rasters. The key aspect of the invention is the design of the cost raster itself, which yields inconspicuous seamlines over a diverse range of image content, especially in the most complex areas where there is human development.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
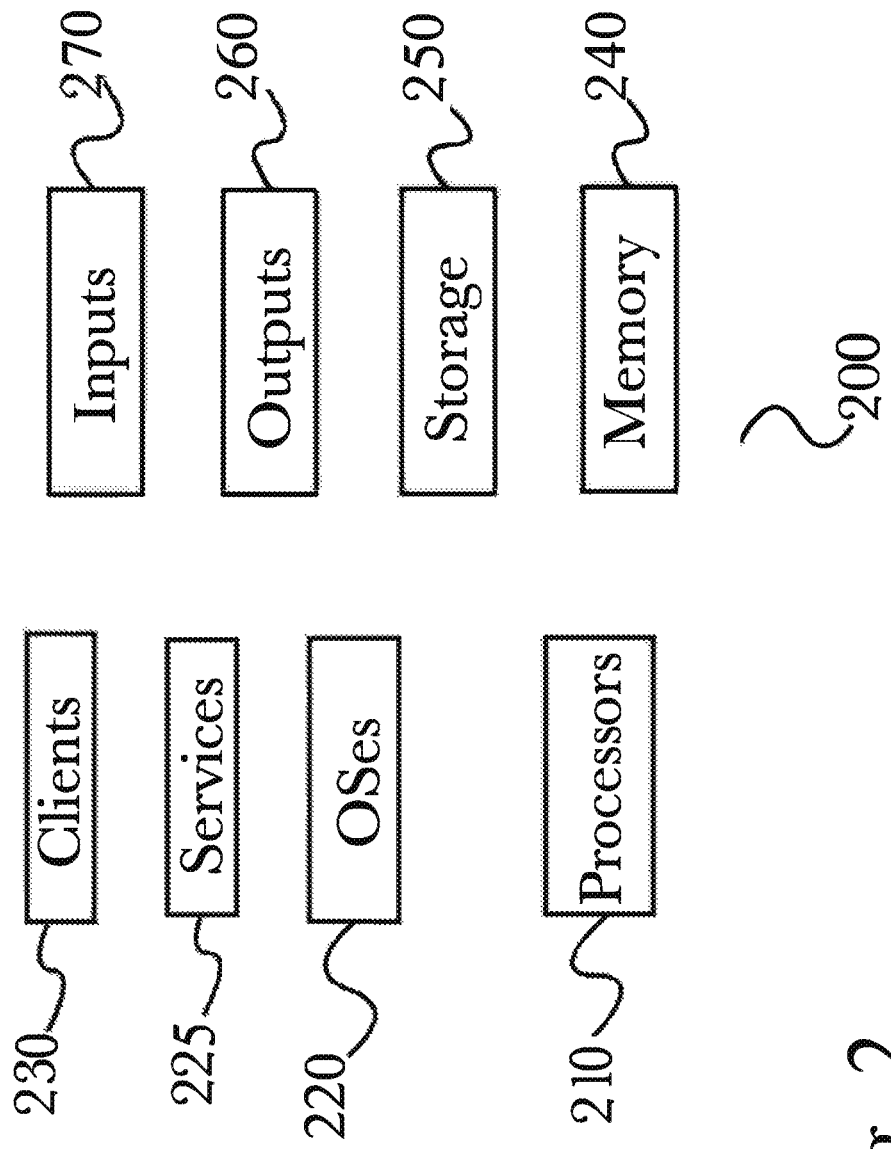
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
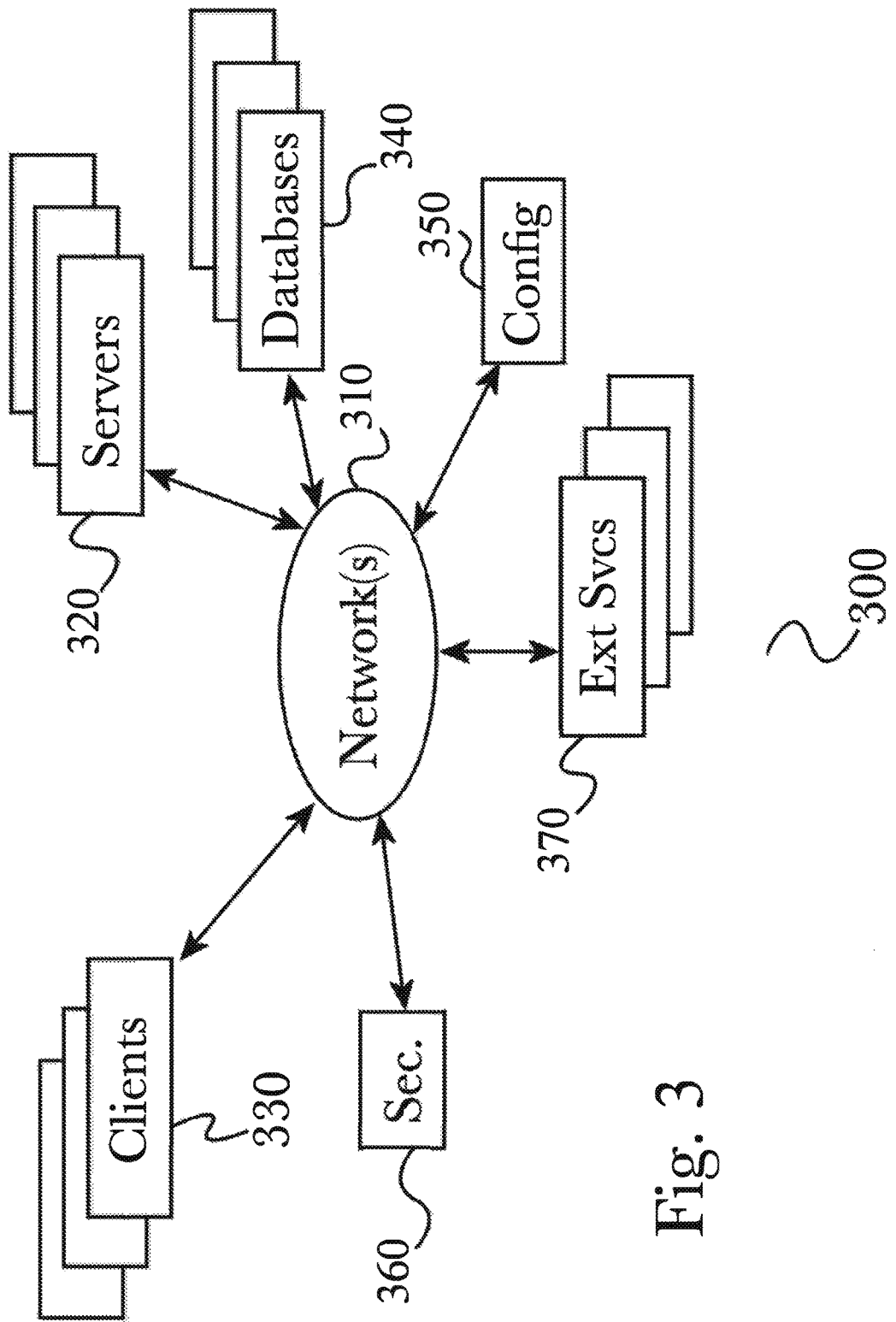
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop CASSANDRA™, Google BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
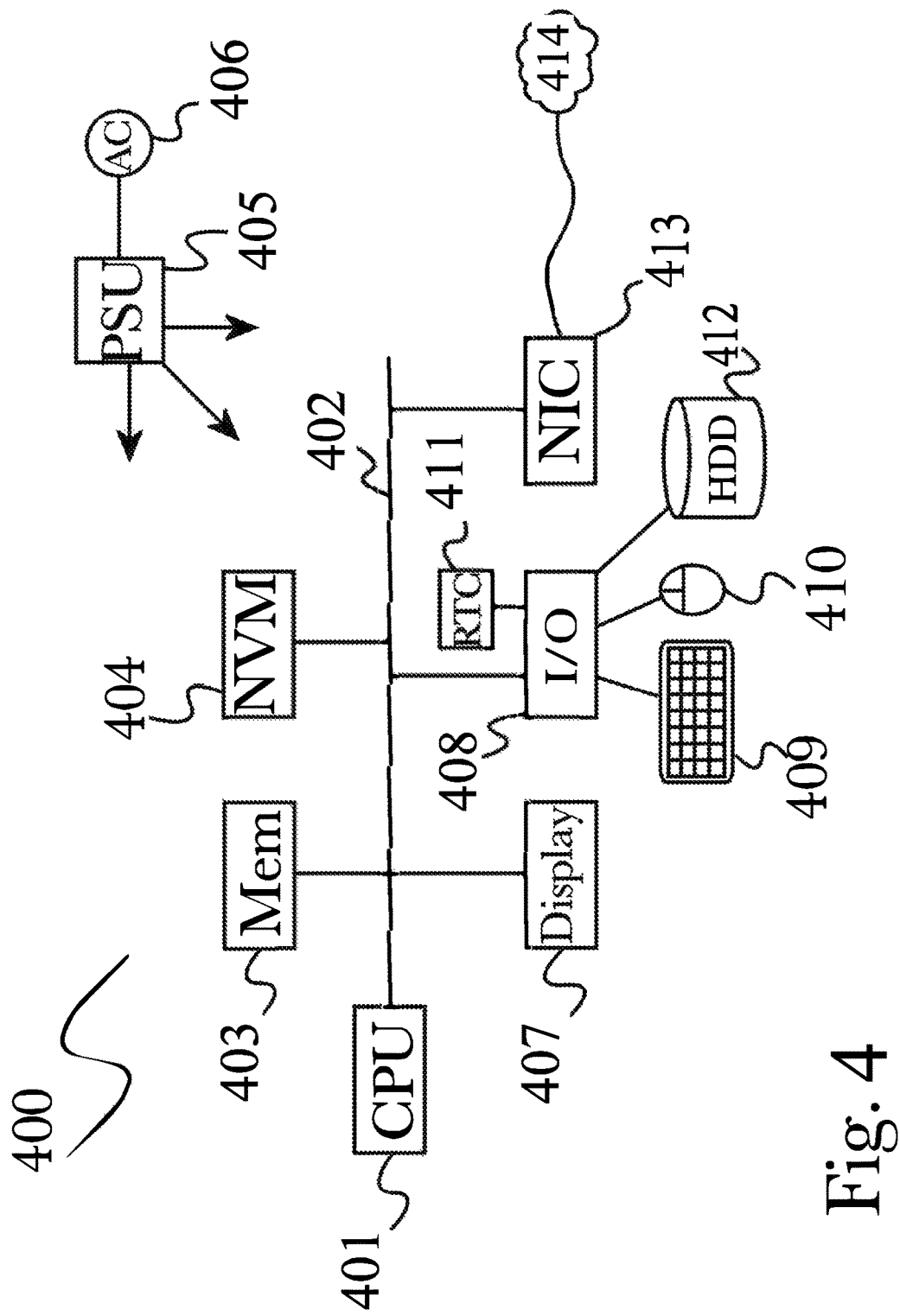
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
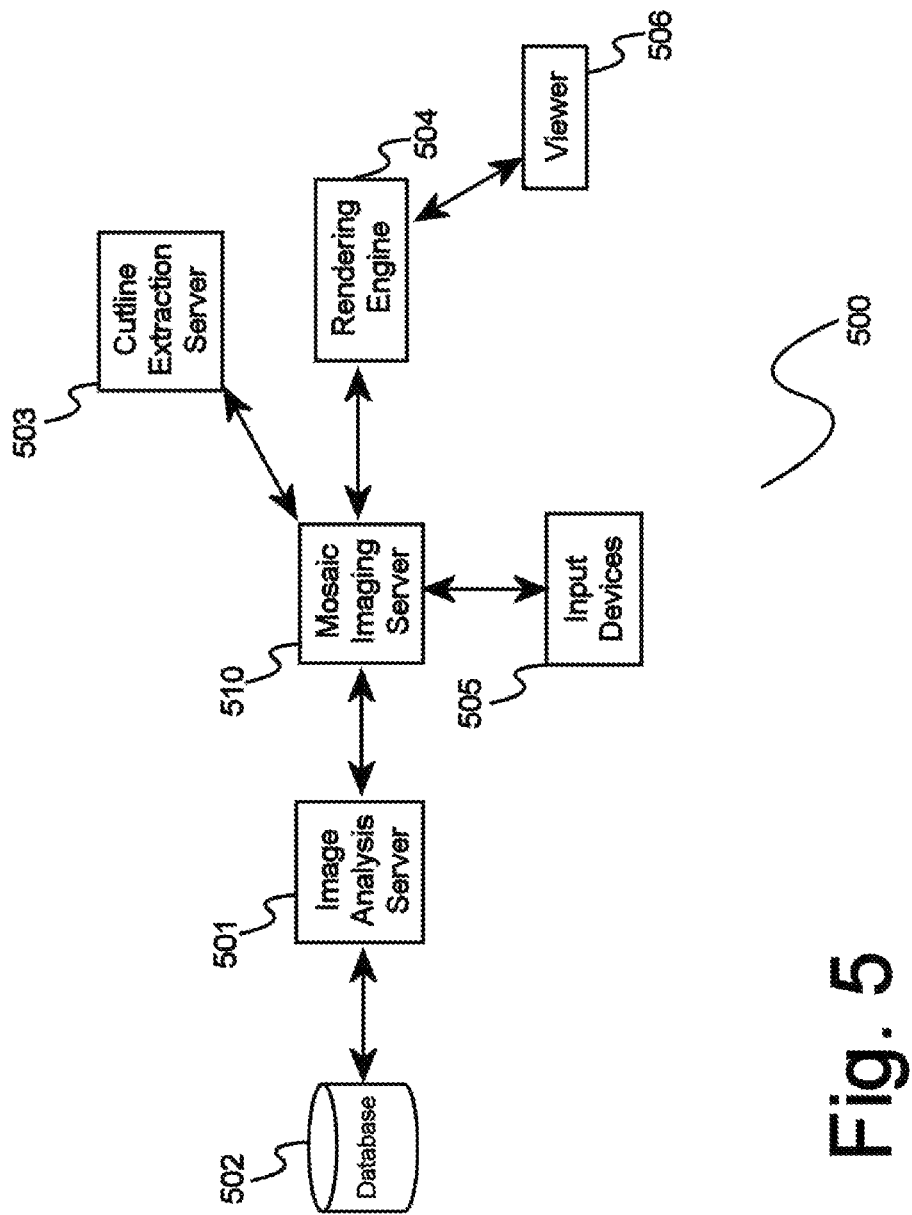
FIG. 5 is a block diagram of an exemplary system architecture for the automated construction of inconspicuous seamlines in an orthomosaic, according to a preferred embodiment of the invention.

FIG. 5 is a block diagram of an exemplary system architecture 500 for semi-automated feature extraction, according to a preferred embodiment of the invention. According to the embodiment, an image analysis server 501 that may be a computing device comprising program code stored in a memory and adapted to perform analysis operations on received vectors such as (for example) retrieving and analyzing vectors from a database 502 that may be a computing device comprising program code stored in a memory and adapted to store and provide data to other components of a system 500. These analyzed images may then be provided to a cutline extraction server 503 that may be a computing device comprising program code stored in a memory and adapted to process images to identify features based at least in part on image content, that may then identify image features such as (for example) roads or other linear features, and compute a cost raster based at least in part on features identified in a given image, for example to identify roads in a satellite photograph and determine a cost raster to identify possible routes and paths based on the roads or terrain identified in the image.

Calculated image information or cost rasters may then be provided to a rendering engine 504, that may analyze the routes and form visualizations of the combined vector and raster data such as may be presentable on a viewer 506 such as a display screen, for example for review by a human user. Additionally, a user may interact with the visualization presented using a variety of input devices 505 such as (for example) a computer mouse or keyboard, such as to manipulate the visualization or modify the information being presented. User input may be received by the rendering engine 504 and utilized to update the rendering appropriately (such as to zoom in or out, for example), or may be further provided by the rendering engine 504 to a feature extraction server 503 as needed, for example to specify new features based on user modification, or to correct an erroneous or imprecise feature.

Additionally, a mosaic imaging server 510 may be utilized to receive and process images or image tiles (that may portions or edited versions of images, for example cropping a single large image into multiple smaller image tiles for ease of use), and may provide these image tiles and mosaics to the image analysis server 501 and feature extraction server 503 for use in vector operations. For example, a plurality of images may be processed by the mosaic imaging server 510 for use as raster image components to be presented optionally with vector information, such as for display and interaction via a viewer 506. The mosaic imaging server 510 may perform such processing operations as to determine bias or offset values for image tiles, to align and match such tiles to form image mosaics (that is, a single composite image from multiple smaller images or tiles), as well as to provide image-based information for use in editing, calculation, or extraction operations according to the embodiment of the invention.

It should be appreciated that according to the embodiment, various means of connection or communication between the components of a system 500 may be utilized according to the invention interchangeably or simultaneously, such as for example a direct, physical data connection (such as via a data cable or similar physical means), a software-based connection such as via an application programming interface (API) or other software communication means (such as may be suitable, for example, in arrangements where multiple system components may operate on a single hardware device such as a computing server or workstation), or any of a variety of network connections such as via the Internet or other data communications network. It should therefore be appreciated that the connections shown are exemplary in nature and represent only a selection of possible arrangements, and that alternate or additional connections may be utilized according to the invention.

Detailed Description of Exemplary Embodiments

Figure 6:
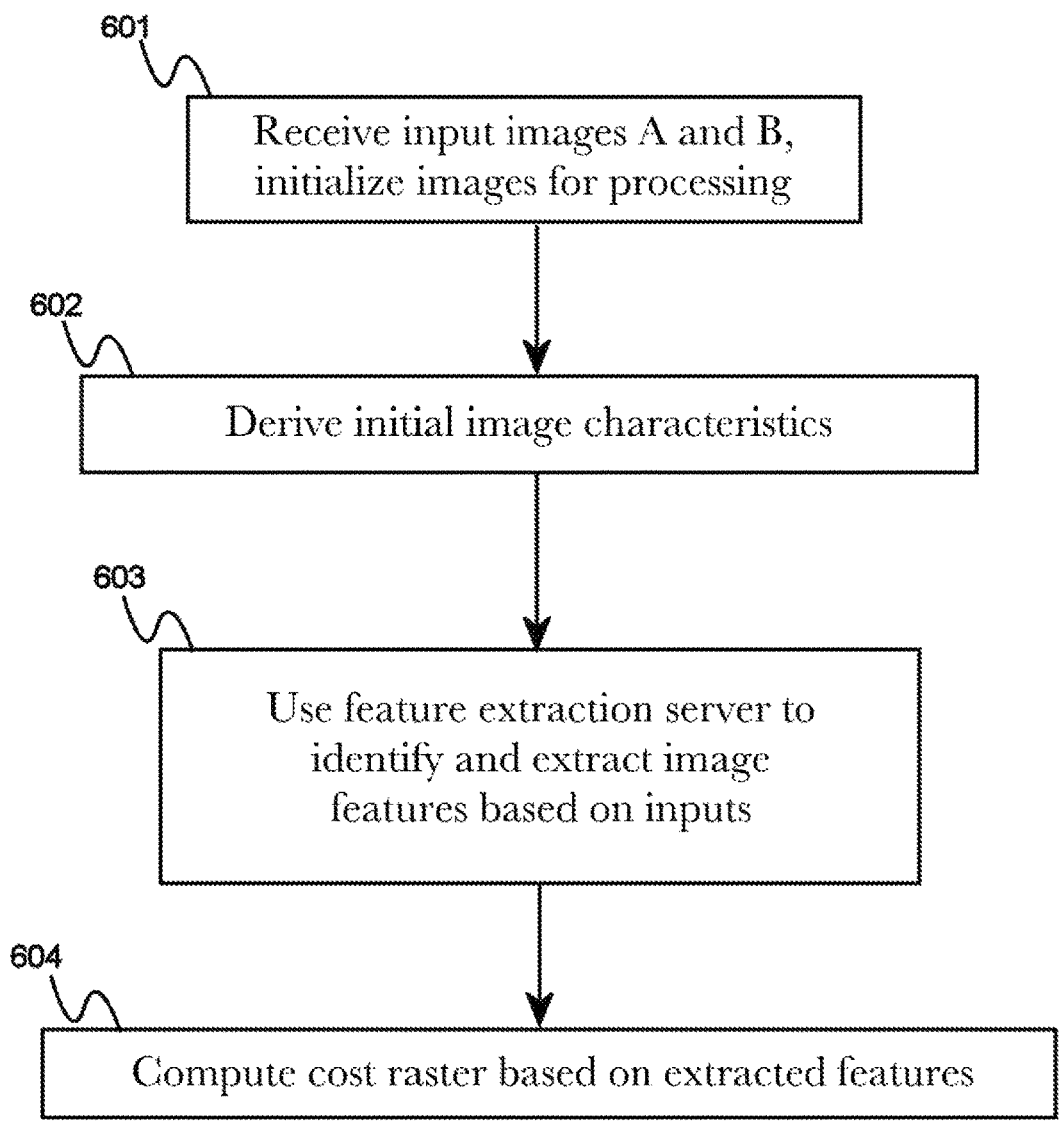
FIG. 6 is a flow diagram illustrating an exemplary method for the automated construction of an inconspicuous seamline within the overlap region of two images, according to a preferred embodiment of the invention.

FIG. 6 is a flow diagram illustrating an exemplary method 600 for the automated construction of an inconspicuous seamline from point P to point Q within the overlap region of images A and B, according to a preferred embodiment of the invention. The points P and Q are where the two image boundaries intersect.

In an initial step 601, the seamline construction server may receive as input a pair of tonally balanced, high-resolution, orthorectified, co-registered (to within a few meters on flat land), pixel-aligned images A and B. It is assumed for the present embodiment that each image has a multi-spectral blue-green (BGRN) representative and a panchromatic (PAN) representative. It is further assumed for the embodiment that the native PAN resolution from the sensor is at most 1 m and the native BGRN resolution from the sensor is at most 4 m. It is further assumed for the embodiment that all image representatives have been resampled to a common pixel size between 0.75 m and 1 m. It is further assumed for the embodiment that the BGRN images have been atmospherically corrected, and that the PAN images have either been atmospherically corrected or in some other way grayscale-normalized (i.e., subjected to a dynamic range adjustment algorithm.)

In a next step 602, the seamline construction server may process the PAN images to remove small particles and very thin linear features from these images. This processing is designed to remove vehicles and stripes from the roads, making roads look more uniform. In a next step 603, the seamline construction server (working with the feature extraction server) may compute a plurality of derived images from the PAN and BGRN images related to particular linear features (such as roads, trails, single-line drainages, farm field boundaries, city boundaries, forest boundaries, mountain crests and ravines, and other boundaries that indicate sharp changes in brightness, hue, or colorfulness) and other features (such as shadow, cloud, snow, water bodies, rivers, vegetation, and forest). The derived images manifest pixels on these features. The derived images are computed by applying various filters (e.g., texture, edge, brightness, hue, colorfulness, NDVI, and various morphological operators for solidifying, cleaning, removing holes and nicks, etc.)

In a next step 604, the seamline construction server may compute a cost raster based on the derived images. Linear feature pixels that are common to both images (e.g. both images A and B may agree that the same location is a road pixel) will generally be assigned low cost—these are desirable pixels for a seamline to pass through. Seamlines are often inconspicuous on common linear features because linear features, being either narrow channels (e.g., road, trail) or boundaries (e.g., edge of forest, edge of farm field), are places where transitions in image content are occurring anyway and are thus effective at hiding a seamlines. In a next step 605, the seamline construction server may compute the seamline as a least cost pixel path from point P to point Q within the cost raster. This pixel path is then vectorized and sent to the mosaic construction server.

The various processes or algorithms mentioned in the steps of the method 600 are explained further below, and it should be appreciated that while reference may be made to specific types of image information or details, these are all provided as exemplary and it should be appreciated that a variety of additional or alternate image details or features may be utilized or derived according to the embodiment.

A seamline request is associated with a pair of images A and B that overlap, and two specified terminal points P and Q The points P and Q may be at the locations where the boundaries of image A and B intersect. In the present embodiment, the images A and B are assumed to be tonally balanced (to each other), high-resolution, orthorectified, co-registered (to within a few meters on flat land), and pixel-aligned. It is assumed for the present embodiment that each image has a multi-spectral BGRN representative and a PAN representative. It is further assumed for the embodiment that the native PAN resolution from the sensor is at most 1 m and the native BGRN resolution from the sensor is at most 4 m. It is further assumed for the embodiment that all image representatives have been resampled to a common pixel size between 0.75 m and 1 m. It is further assumed for the embodiment that the BGRN images have been atmospherically corrected, and that the PAN images have either been atmospherically corrected or in some other way grayscale-normalized (i.e., subjected to a dynamic range adjustment algorithm.)

For narrow linear channels such as roads, a pixel may be said to lie on a "common road" if it lies on road in both image A and image B. For boundaries such as forest boundary, a pixel may be said to lie on "common forest boundary" if it lies near forest boundary in both image A and image B. For broad areas such as forest, a pixel may be said to lie on "common forest" if it lies on forest in image A and image B.

In a preferred embodiment, the cost raster assigns low cost to pixels of the following types (giving the seamline ample opportunity to find an inconspicuous trajectory):

Common road, trail, and single-line drainage
Common farm field boundary
Common forest boundary
Common mountain crests and ravines
Common shore around water bodies
Common boundary where there is an abrupt change in brightness, colorfulness, hue, or texture
Common shadow areas
Common forest areas of similar color tonality
Common low-texture areas of very similar color tonality
Boundary of the union of city region in A and city region in B
Narrow bands of vegetation in either image In a preferred embodiment, the cost raster assigns high cost to pixels of the following types (which often do not lend themselves well to an inconspicuous seamline):

Water areas in either image
Snow areas in either image
Cloud in either image
Cloud shadow in either image
Very bright areas in either image
Non-forest high-texture areas in either image
Low-texture areas of dissimilar tonality
Black fill in either image
Exclusive-OR of shadow areas
Exclusive-OR of vegetation areas In a preferred embodiment, a baseline middle cost (between low and high) is assigned to all other pixels (not covered by the previous two paragraphs) in the cost raster.

In a preferred embodiment, the cost raster is built from a sequential precedence ordering (lowest precedence to highest precedence) of the pixel types characterized above. If a pixel is of more than one type, then of those types, the one of highest precedence determines which cost (low, medium, high) is assigned to the pixel in the cost raster. This is how ties are broken in deciding which cost to assign any given pixel in the cost raster.

It remains to describe, for an embodiment, how the pixels of each type are automatically and sufficiently identified in the images A and B. To remove traffic from the roads, segmentation of the PAN may be used to find small bright particles, with each such particle replaced by the median pixel value on its outer boundary. To remove stripes from the roads, a kind of median filter may be applied to the PAN. Road, trail, and single-line drainage pixels may be identified in the PAN. High-texture pixels may be identified from the PAN as pixels at the centers of local regions showing large variability in their grayscale values. Vegetation pixels may be identified from the BGRN as those with high NDVI. Forest pixels may be identified as vegetation pixels with high-texture. Farm field boundary may be identified as hard edge pixels (from PAN) against low-texture (from PAN) vegetation (from BGRN). Mountain crests and ravines may be identified in the PAN by degrading the PAN using aggregation, and identifying hard edge pixels in the degraded image. Water body pixels may be identified in the PAN as very dark pixels, or in the BGRN as very blue pixels or a water index. Shadow pixels may be identified from the PAN as very dark pixels. City pixels may be identified as a morphological closure of hard edge pixels (from PAN) that originates shadow (from PAN and sun azimuth). Pixels of similar color tonality between BGRN A and BGRN B may be determined by first applying small-scale smoothing to each image and then computing a measure of spectral distance between corresponding pixels in the two images. Cloud and snow pixels may be identified as very bright pixels (from PAN) that form large cohesive connected components. Cloud shadow pixels may be identified as very dark pixels (from PAN) that form large cohesive connected components.

In describing the steps above, which participate in the construction of the cost raster, it should be appreciated that mention of numerous morphological processing steps (dilation, erosion, opening, closure, filling of small holes, etc.) were omitted for brevity, as they were not necessary to mention for one to understand the overall method.

The skilled person will be aware of a range of possible modifications of the various embodiments described above. Accordingly, the present invention is defined by the claims and their equivalents.

What is claimed is:

1. A method for creating seamlines in orthomosaic imagery using a cost, comprising the steps of:
   receiving, at an image analysis server, a plurality of input images;
   identifying, using a feature extraction server, a plurality of linear image features within the plurality of input images;
   computing a cost raster based at least in part on at least a portion of the plurality of image features identified;
   automatically generating seamlines along at least some of the linear image features using cost minimization; and
   vectorizing the generated seamlines.

* * * * *